Patented Sept. 23, 1941

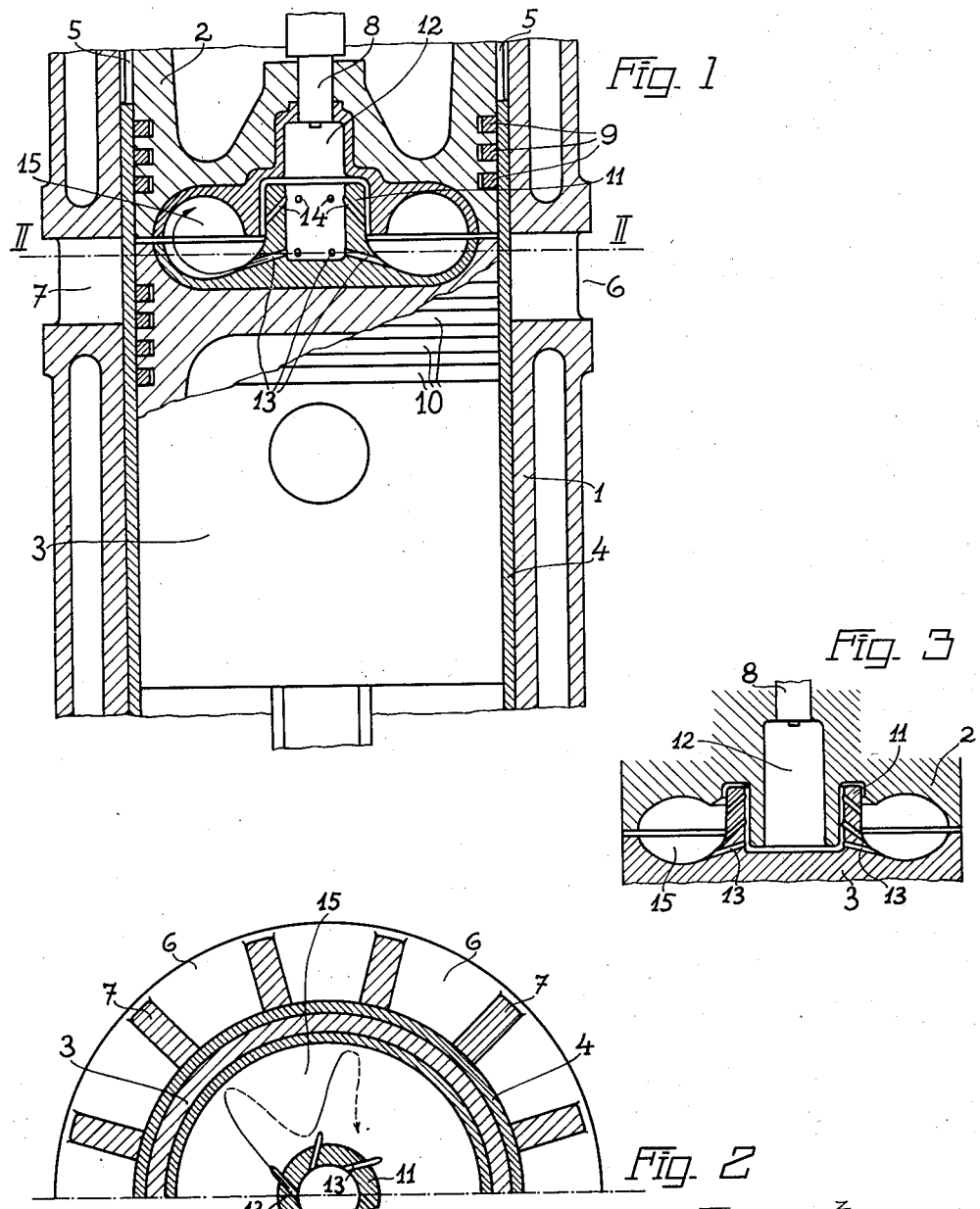

2,256,776

UNITED STATES PATENT OFFICE 2,256,776

COMPRESSION IGNITION ENGINE

George Stephen Kammer, Geneva, Switzerland

Application February 21, 1939, Serial No. 257,743. In Germany and Switzerland November 26, 1938

2 Claims. (Cl. 123—33)

This invention is directed to internal combustion engines of the compression ignition type.

Engines of this type are known in which the piston has a projection in the form of a collar or swell with passages provided in the wall of said projection and extending at an angle to the radial. At or near the inner dead center of the piston the collar cooperates with the cylinder head to constitute a precombustion chamber into which the fuel is introduced.

The object of the present invention is to provide means for making use of the pressures prevailing in the precombustion chamber of engines of the type mentioned which, in consequence of the ignition, are higher than those ruling in the working space to increase useful work and also to systematically utilize these higher pressures for intimately intermixing the mixture coming from the precombustion chamber and the air present in the working space which constitutes the greater part of the quantity of compressed air present so as to provide a smaller quantity of excess air.

In more specific accordance with the invention, the collar or swell on the piston at or near the inner dead center thereof constitutes with the cylinder head a part of the wall and the whole of the base of the precombustion chamber. A recess surrounds the collar or swell on the piston which, in combination with a corresponding recess in the cylinder head, constitutes an annular combustion space having a greater volume than the precombustion chamber. The passages in the wall of the collar or swell arranged at an angle to the radial are directed at the same time substantially tangentially to the surface of one of the recesses, so that the gases passing through these passages carry out rotary movements in the combustion space both about the cylinder axis and about the center line of the space. On the ignition of the fuel introduced into the precombustion chamber, the increasing pressures will perform useful work on that part of the piston bounded by the collar, and the burning mixture will blow at high velocity through the passages in the collar, so that due to the rotary movement referred to above the particles of fuel still unburnt will be mixed very thoroughly with the air in the annular space.

The accompanying drawing shows by way of example the essential parts of an internal combustion engine in accordance with the invention, and therein Figure 1 is an axial section through the parts at the upper dead centre, and Figure 2 is a half section on the line II—II of Figure 1.

Figure 3 shows a modified form of the invention.

Referring to the drawing, the piston 3 moves in the cylinder 1, which is closed by the cylinder head 2. A sleeve valve 4 is provided to control the admission and exhaust. The exhaust is effected through the port 5 of the valve 4 as soon as the latter has come to the height of the exhaust port 6. The latter extends over a large part of the periphery, and for this reason the parts of the cylinder located below and above this port are connected by ribs 7, which serve also for guiding the valve 4. The admission port is not shown. The fuel is introduced through a nozzle 8 provided in the cylinder head 2. For making the working space tight, packing rings 9 and 10 are provided on the cylinder head and the piston respectively.

The piston 3 has an insertion, preferably of refractory steel, in the form of a circular collar or swell 11. In the position shown, namely the inner dead centre of the piston, the collar 11 projects into a hollow 12 in the cylinder head 2. The collar 11 is pierced by passages 13 and 14 at two different heights communicating with the space 15 around the collar. As may be seen from Figure 2, these passages are in a direction which is not radial, and Figure 1 shows that they are also tangential to the wall of the space 15. The space 15 of circular cross section is constituted by an annular groove on the cylinder head 2 and a corresponding groove on the piston 3, and its volume at the inner dead center position of the piston is greater than that of the precombustion chamber 12.

When the piston 3 approaches its inner dead centre the collar 11 enters the hollow 12 and thus separates the space 12 from the space 15, so that the two spaces are in communication at first only by the passages 13 and 14, and then on further movement of the piston 3 by the passages 13 alone. In consequence of the ignition of the fuel introduced into the space 12 by the nozzle 8 the pressure rises here and acts direct on the piston. Since, however, the piston area enclosed by the collar 11 is of small extent no inadmissibly high pressures are transmitted to the driving parts. The burning mixture flows through the passages 13 into the space 15. Because of the comparatively small cross-section of these passages the gases pass out of the same at a high velocity, so that the flow in the space 15 takes place in a kind of helical path of which the axis coincides with the centre line of the toroidal space 15. In consequence of this flow the further quantities of fuel continuously introduced are thoroughly distributed throughout the air in the space 15.

As the piston 3 moves outwards the passages 14 also are uncovered and then the collar 11 leaves the hollow 12, so that the space 12 and the space 15 are merged into one.

According to the modification shown in Fig. 3 the collar 11 surrounds the side walls of the space 12 instead of being inside them. The passages through the collar are arranged at three different levels. The space 15 has an oval cross-section.

The numbers and diameters of the passages 13 and 14 are determined by the fuel to be used, as also is the distance between the two rows of passages. With volatile fuels the diameter should be larger and the rows nearer together, and with heavier fuels the conditions should be reversed.

If required, the passages through the collar may all be arranged at the same axial level.

The space 15 need not be of a circular or oval shape; it may have any convenient cross-section.

I claim:

1. A compression ignition engine comprising a working cylinder, a piston movable therein, a projection on said piston in the form of a collar, cooperating near the inner dead centre of the piston with the cylinder head to constitute a part of the wall and the whole base of a precombustion space, a fuel nozzle in the cylinder head leading into the space surrounded by said collar near the inner dead centre of the piston, a recess in the piston, surrounding the collar, and said cylinder head being formed with a second recess, said recesses together constituting an annular combustion space of circular cross section which at the inner dead center position of the piston contains the greater part of the quantity of air present, and passages in the collar-wall directed substantially tangentially to the surface of the recess and at an angle to the radial.

2. A compression ignition engine comprising a working cylinder, a piston movable therein, a projection on said piston in the form of a collar, surrounded near the inner dead centre of the piston by the side walls of a hollow in the cylinder head and constituting a part of the wall and the whole base of a precombustion space, a fuel nozzle in the cylinder head leading into said hollow, a recess in the piston, surrounding the collar, and said cylinder head being formed with a second recess, said recesses together constituting an annular combustion space of circular cross section which at the inner dead center position of the piston contains the greater part of the quantity of air present, and passages in the collar-wall, directed substantially tangentially to the surface of the recess and at an angle to the radial, and being covered near the inner dead centre of the piston by the side wall of the hollow in the cylinder head.

GEORGE STEPHEN KAMMER.